US008528093B1

(12) United States Patent
Kureha et al.

(10) Patent No.: US 8,528,093 B1
(45) Date of Patent: Sep. 3, 2013

(54) APPARATUS AND METHOD FOR PERFORMING DYNAMIC SECURITY TESTING USING STATIC ANALYSIS DATA

(75) Inventors: Toshinari Kureha, Redwood City, CA (US); Koorosh Nouri, Foster City, CA (US); Arthur Do, Danville, CA (US); Brian Chess, Mountain View, CA (US); Roger Thornton, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 11/734,114

(22) Filed: Apr. 11, 2007

Related U.S. Application Data

(60) Provisional application No. 60/791,692, filed on Apr. 12, 2006.

(51) Int. Cl.
*H04L 29/06* (2006.01)

(52) U.S. Cl.
USPC .......... 726/25

(58) Field of Classification Search
USPC .......... 726/25
See application file for complete search history.

(56) References Cited

U.S. PATENT DOCUMENTS

| | | | | |
|---|---|---|---|---|
| 7,284,274 | B1 * | 10/2007 | Walls et al. | 726/25 |
| 7,392,545 | B1 * | 6/2008 | Weber et al. | 726/25 |
| 7,779,472 | B1 * | 8/2010 | Lou | 726/24 |
| 2001/0013094 | A1 * | 8/2001 | Etoh et al. | 712/227 |
| 2003/0233581 | A1 * | 12/2003 | Reshef et al. | 713/201 |
| 2005/0273854 | A1 | 12/2005 | Chess et al. | |
| 2005/0273859 | A1 | 12/2005 | Chess et al. | |
| 2005/0273860 | A1 | 12/2005 | Chess et al. | |
| 2005/0273861 | A1 | 12/2005 | Chess et al. | |

* cited by examiner

*Primary Examiner* — Jeffrey D Popham

(57) ABSTRACT

A computer readable storage medium includes executable instructions to perform a static analysis of a set of target code to identify a first set of security issues. A dynamic analysis of the target code is executed to identify a second set of security issues. The first set of security issues and the second set of security issues are compared and common security issues are reported.

12 Claims, 6 Drawing Sheets

APPARATUS AND METHOD FOR PERFORMING DYNAMIC SECURITY TESTING USING STATIC ANALYSIS DATA

CROSS-REFERENCE TO RELATED APPLICATION

This application claims priority to U.S. Provisional Patent Application 60/791,692, filed Apr. 12, 2006, entitled "Apparatus and Method for Performing Security Testing with Static Analysis Data".

BRIEF DESCRIPTION OF THE INVENTION

This invention relates generally to software security. More particularly, this invention relates to the use of static analysis data in combination with dynamic security testing information to assess software security.

BACKGROUND OF THE INVENTION

U.S. Patent Publications 2005/0273861, 2005/0273860, 2005/0273859 and 2005/0273854 disclose techniques for performing static analyses of computer source code. These commonly owned patent applications are incorporated herein by reference. It would be desirable to further leverage these static analysis techniques to identify additional security issues associated with computer code.

SUMMARY OF THE INVENTION

The invention includes a computer readable storage medium with executable instructions to perform a static analysis of a set of target code to identify a first set of security issues. A dynamic analysis of the target code is executed to identify a second set of security issues. The first set of security issues and the second set of security issues are compared and common security issues are reported.

The invention also includes a computer readable storage medium with a static analysis module to identify a first set of security issues in target code. A comparison module receives a second set of security issues from a dynamic testing module applied to the target code. The comparison module is configured to compare the first set of security issues and the second set of security issues to report common security issues.

The invention also includes a computer readable storage medium with a dynamic testing module to identify a first set of security issues in target code. A comparison module receives a second set of security issues from a static analysis module applied to the target code. The comparison module is further configured to compare the first set of security issues and the second set of security issues to report common security issues.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
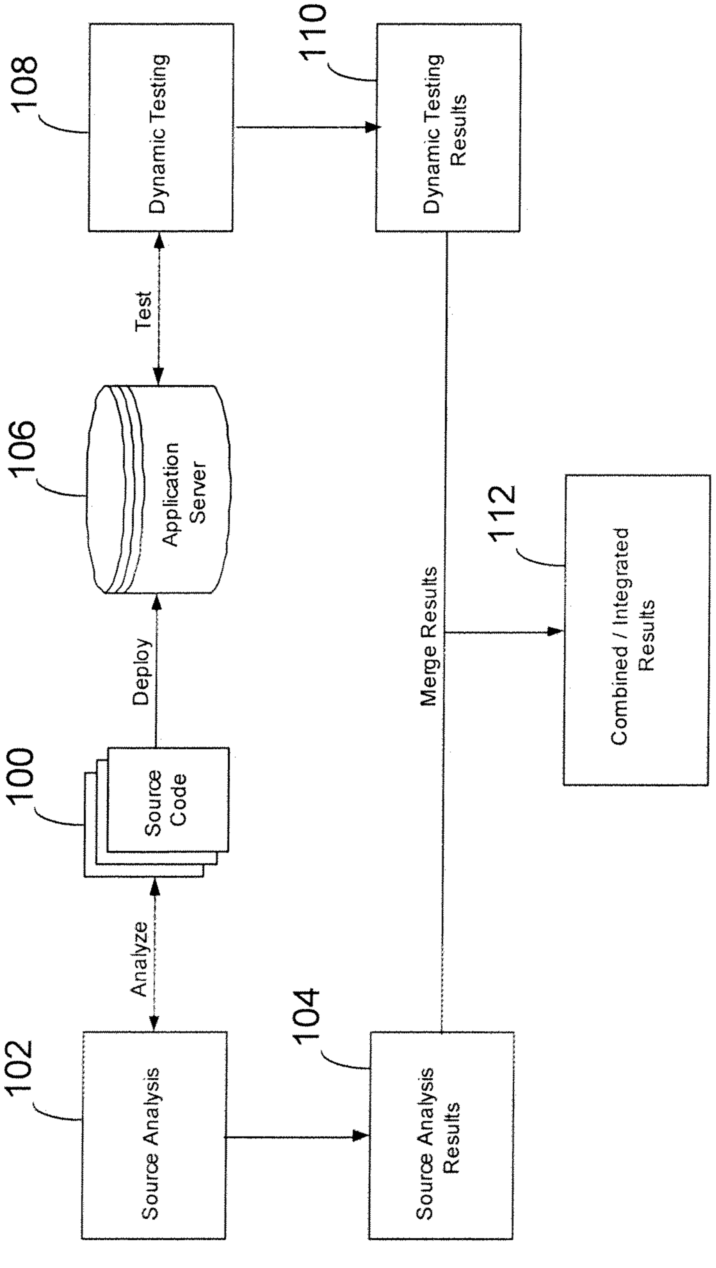
FIG. 1 illustrates a system utilized in accordance with an embodiment of the invention.

FIG. 1 illustrates a system configured in accordance with an embodiment of the invention. The system includes a set of executable code (e.g., source code) 100 that is subject to a static analysis 102 (also referred to herein as a source analysis). For example, the static analysis 102 may be performed in accordance with one of more of the techniques disclosed in the previously identified U.S. Patent Publications. Such a static analysis renders static analysis results 104. By way of example, the static analysis results may include the following information:

Security Issue: SQL Injection
URL: /path/finalUrl
Parameter Name: param1
Source Code Information This information is gathered by analyzing the structure and flow of the source code. Further information about the source code 100 may be secured by executing the code and observing its operation. In particular, an application server 106 may be used to execute the code. Dynamic testing (e.g., penetration testing) 108 may be applied to the executing code to produce dynamic testing results 110. The static analysis results 104 and the dynamic testing results 110 may then be merged to form integrated results 112. The integrated results 112 may be all of the information from the static analysis 102 and the dynamic testing 108. Alternately, the security issues from the static analysis may be compared to the security issues from the dynamic testing 108 to identify common security issues.

Because dynamic testing determines the existence of security issues from outside probing, it cannot provide accurate information on the underlying cause of the vulnerability in the source code. However, by combining static analysis results with dynamic testing results, one can provide "inside the box" information.

Suppose that dynamic testing provides the following information:

Security Issue: SQL Injection
URL: http://somewebsite.com:8080/path/finalUrl
Parameter Name: param 1

By matching the security issue category, partial URL (URL reported in dynamic testing ends with URL reported in source analysis), and parameter name, one can link static analysis information with dynamic testing information. This gives users the ability to really see what is wrong with the source code that resulted in the security issue that dynamic testing revealed.

Figure 2:
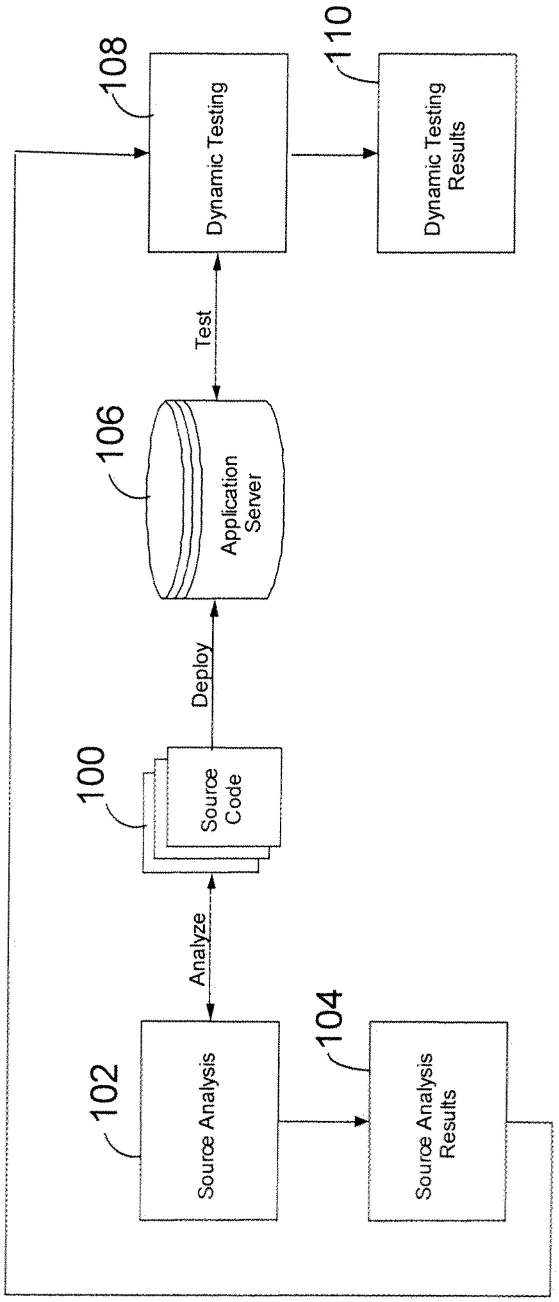
FIG. 2 illustrates an alternate system utilized in accordance with an embodiment of the invention.

Another way source analysis results can be used with dynamic testing is by providing this information as the input to dynamic testing. This operation is shown in FIG. 2. FIG. 2 is similar to FIG. 1, but includes the utilization of static analysis results in dynamic testing. In other words, the security issues identified during static analysis are used to tailor the dynamic analysis.

Static analysis results contain valuable information that cannot be found by simply probing from the outside. By providing this information in dynamic testing, dynamic testing can be more comprehensive and accurate.

For example, a static analysis reveals that a particular URL has a parameter called "BypassDebugXYZ". In the normal course of using the web application, this parameter is never used. Thus, normal dynamic testing will not expose the existence of this particular parameter. Suppose, for example, that this parameter is vulnerable to SQL Injection. Normal dynamic testing can never find this SQL Injection security issue unless it can guess that there is a parameter name called “BypassDebugXYZ”.

However, by providing static analysis results to dynamic testing, dynamic testing can now learn the existence of this parameter and now test this parameter for any security issues.

Figure 3:
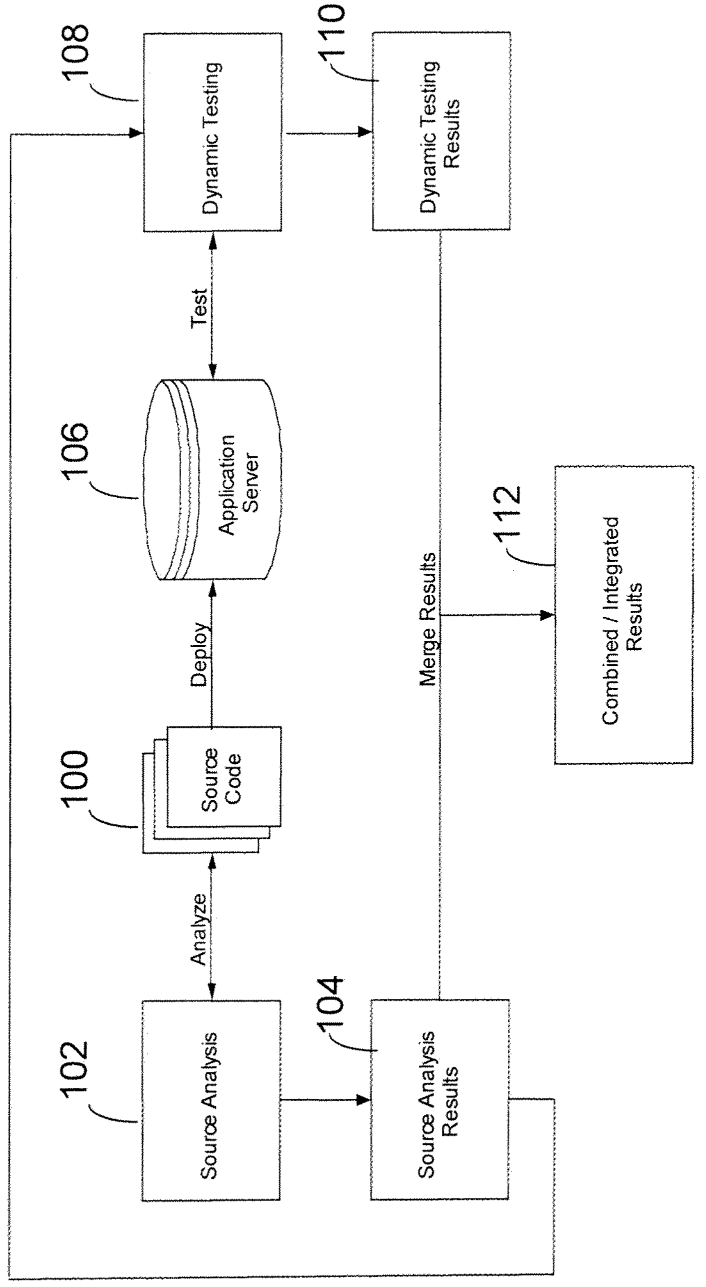
FIG. 3 illustrates another system utilized in accordance with an embodiment of the invention.

Note that both approaches described above can be combined so that all of the benefits can be derived using the same system. This combined approach is shown in FIG. 3.

The invention is more fully appreciated with a specific example. The following code is exemplary output from a static analysis.

```
<Vulnerability xmlns="xmlns://www.fortifysoftware.com/schema/fvdl">
  <ClassInfo>
    <ClassID>45736FF1-7342-4ABC-9C14-BA72A9023121</ClassID>
    <Type>SQL Injection</Type>
    <DefaultSeverity>4.0</DefaultSeverity>
  </ClassInfo>
  <InstanceInfo>
    <InstanceID>361ABA5BAD51E53FD7E0AEAFAFF60CCC</InstanceID>
    <InstanceSeverity>4.0</InstanceSeverity>
    <Confidence>5.0</Confidence>
  </InstanceInfo>
  <AnalysisInfo>
    <Dataflow>
      <Source outArg="return" ruleID="B7EF47C8-3CBA-41C3-9008-AF7CE21A9282">
        <SourceRef sourceRefID="4744114E69115B6E215C448AE28ED572B695319E">
          <FunctionCall>
            <SourceLocation

path="src2/main/as/securitytesting/visualstudio/src/AspnetSampleApp/Login.aspx.cs"
              line="58" lineEnd="58" colStart="0"
              colEnd="0"
snippet="src2/main/as/securitytesting/visualstudio/src/AspnetSampleApp/Login.aspx.cs:58:58
"/>
            <Function name="get_Text"
              namespace="System.Web.UI.WebControls" enclosingClass="TextBox"/>
          </FunctionCall>
        </SourceRef>
        <Context>
          <Function name="LoginBtn_Click"
            namespace="ASPNET.StarterKit.Commerce"
enclosingClass="Migrated_Login"/>
        </Context>
      </Source>
      <Sink inArg="0" ruleID="45736FF1-7342-4ABC-9C14-BA72A9023121">
        <SourceRef
sourceRefID="3C099D4A72216D0E58D8839E883A247DAD90315F">
          <FunctionCall>
            <SourceLocation

path="src2/main/as/securitytesting/visualstudio/src/AspnetSampleApp/App_Code/Component
s/CustomersDB.cs"
              line="239" lineEnd="239" colStart="0"
              colEnd="0"
snippet="src2/main/as/securitytesting/visualstudio/src/AspnetSampleApp/App_Code/Compon
ents/CustomersDB.cs:239:239"/>
            <Function name="SqlCommand"
              namespace="System.Data.SqlClient" enclosingClass="SqlCommand"/>
          </FunctionCall>
        </SourceRef>
        <Context>
          <Function name="Login"
            namespace="ASPNET.StarterKit.Commerce"
enclosingClass="CustomersDB"/>
        </Context>
      </Sink>
      <Path>
        <Node inArg="0">
          <SourceRef
sourceRefID="26F845636731212BE81CFC61C1641016A15A6732">
            <FunctionCall>
              <SourceLocation

path="src2/main/as/securitytesting/visualstudio/src/AspnetSampleApp/Login.aspx.cs"
                line="58" lineEnd="58" colStart="0"
                colEnd="0"
snippet="src2/main/as/securitytesting/visualstudio/src/AspnetSampleApp/Login.aspx.cs:58:58
"/>
              <Function name="Login"
                namespace="ASPNET.StarterKit.Commerce"
```

-continued

```
enclosingClass="CustomersDB"/>
          </FunctionCall>
        </SourceRef>
        <Context>
          <Function name="LoginBtn_Click"
            namespace="ASPNET.StarterKit.Commerce"
enclosingClass="Migrated_Login"/>
        </Context>
      </Node>
      <Node>
        <SourceRef>
          <Statement type="assignment">
            <SourceLocation

path="src2/main/as/securitytesting/visualstudio/src/AspnetSampleApp/App_Code/Component
s/CustomersDB.cs"
              line="235" lineEnd="235" colStart="0"
              colEnd="0"
snippet="src2/main/as/securitytesting/visualstudio/src/AspnetSampleApp/App_Code/Compon
ents/CustomersDB.cs:235:235"/>
            <Variable name="CS$0$0001"/>
          </Statement>
        </SourceRef>
        <Context>
          <Function name="Login"
            namespace="ASPNET.StarterKit.Commerce"
enclosingClass="CustomersDB"/>
        </Context>
      </Node>
      <Node inArg="0" outArg="return" ruleID="2481BF8F-B054-44A9-B782-
B4863117C053">
        <SourceRef
sourceRefID="A2AD2DED7D4F175D7DB5D21BF08A55C082D0494A">
          <FunctionCall>
            <SourceLocation

path="src2/main/as/securitytesting/visualstudio/src/AspnetSampleApp/App_Code/Component
s/CustomersDB.cs"
              line="235" lineEnd="235" colStart="0"
              colEnd="0"
snippet="src2/main/as/securitytesting/visualstudio/src/AspnetSampleApp/App_Code/Compon
ents/CustomersDB.cs:235:235"/>
            <Function name="Concat" namespace="System" enclosingClass="String"/>
          </FunctionCall>
        </SourceRef>
        <Context>
          <Function name="Login"
            namespace="ASPNET.StarterKit.Commerce"
enclosingClass="CustomersDB"/>
        </Context>
      </Node>
      <Node>
        <SourceRef>
          <Statement type="assignment">
            <SourceLocation

path="src2/main/as/securitytesting/visualstudio/src/AspnetSampleApp/App_Code/Component
s/CustomersDB.cs"
              line="235" lineEnd="235" colStart="0"
              colEnd="0"
snippet="src2/main/as/securitytesting/visualstudio/src/AspnetSampleApp/App_Code/Compon
ents/CustomersDB.cs:235:235"/>
            <Variable name="mySelectQuery"/>
          </Statement>
        </SourceRef>
        <Context>
          <Function name="Login"
            namespace="ASPNET.StarterKit.Commerce"
enclosingClass="CustomersDB"/>
        </Context>
      </Node>
    </Path>
    <TaintFlags>
      <TaintFlag name="HTTPRS"/>
      <TaintFlag name="WEB"/>
      <TaintFlag name="XSS"/>
    </TaintFlags>
  </Dataflow>
</AnalysisInfo>
<ExternalEntries>
```

-continued

```
150     <Entry name="" type="custom">
151         <URL>/login.aspx</URL>
152         <Fields>
153             <Field name="email">
154         </Fields>
155         <SourceLocation
156
157 path="src2/main/as/securitytesting/visualstudio/src/AspnetSampleApp/Login.aspx.cs"
158             line="58" lineEnd="58" colStart="0" colEnd="0"
159 snippet="src2/main/as/securitytesting/visualstudio/src/AspnetSampleApp/Login.aspx.cs:58:58
160 "/>
161         </Entry>
162     <Entry name="" type="custom">
163         <URL>/login.aspx</URL>
164         <SourceLocation
165
166 path="src2/main/as/securitytesting/visualstudio/src/AspnetSampleApp/Login.aspx.cs"
167             line="58" lineEnd="58" colStart="0" colEnd="0"
168 snippet="src2/main/as/securitytesting/visualstudio/src/AspnetSampleApp/Login.aspx.cs:58:58
169 "/>
170         </Entry>
171     </ExternalEntries>
172 </Vulnerability
```

Going from top to bottom, the first section <ClassInfo> (lines 2-6) gives generic information about an identified security issue. In this particular case, it states that the "type" of security issue is "SQL Injection" and has a severity value of "4.0" (higher number means more severe).

The next section comprises <Dataflow> (lines 13-138). This section explains how the data flowed through the application. There are 3 main parts—the "Source" (lines 14-31), "Sink" (lines 32-51), and "Path" (lines 52-132). The "Source" is where the data enters the application. The "Sink" is where the data eventually ends up. The "Path" tells how the data can go from the "Source" to the "Sink".

All 3 of these 'elements' essentially have the same structure "SourceRef". Taking a look at one of the examples:

```
  <SourceRef
sourceRefID=
"A2AD2DED7D4F175D7DB5D21BF08A55C082D0494A">
      <FunctionCall>
          <SourceLocation
path="src2/main/as/securitytesting/visualstudio/src/AspnetSampleApp/
App_Code/Components/CustomersDB.cs"
              line="235" lineEnd="235" colStart="0"
              colEnd="0"
snippet="src2/main/as/securitytesting/visualstudio/src/AspnetSampleApp/
App_Code/Components/CustomersDB.cs:235:235"/>
          <Function name="Concat" namespace="System"
enclosingClass="String"/>
      </FunctionCall>
  </SourceRef>
```

This states that this is a function call—the location of the source code is "CustomersDB.cs" file, at line 235, and the function being called is the "concat" function in the class "string".

The <URL> and <Field> elements under the <ExternalEntries> element (lines 140-158) are the keys that bind the result of static analysis with URLs found in a running system. <URL> indicates the relative URL where this security issue happens in the web application, and the <Field> indicates what parameter in that particular URL is vulnerable.

Figure 4:
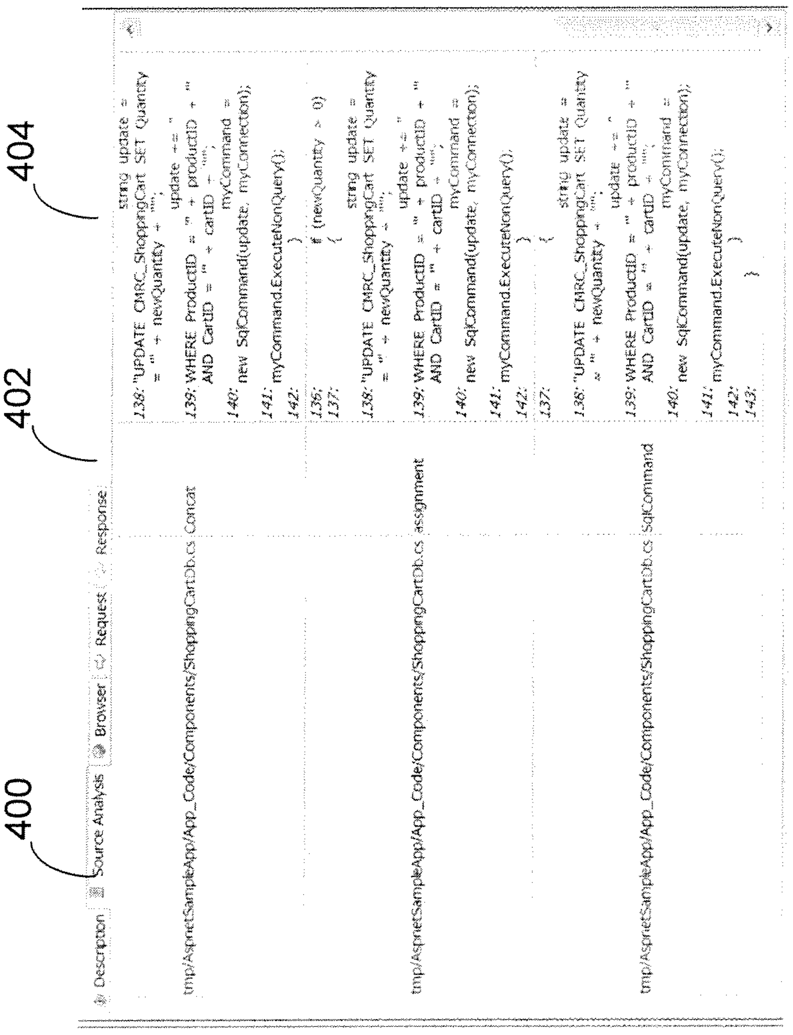
FIG. 4 illustrates a screen shot of security issues reported in accordance with an embodiment of the invention.

The crux of this technique is linking the results from the static and dynamic analyses. One linking may be established using URL, Field(parameter name), and the vulnerability type available in static analysis result with the URL, parameter name, and the vulnerability type reported in the dynamic analysis. If these match, then one can show the "Dataflow" information (and any other information of interest) from static analysis in the dynamic testing result as seen in the screenshot of FIG. 4. Block 400 of FIG. 4 identities the source code location, while block 402 specifies the function being called. Block 404 shows the actual source code snippet for a particular security issue.

Figure 5:
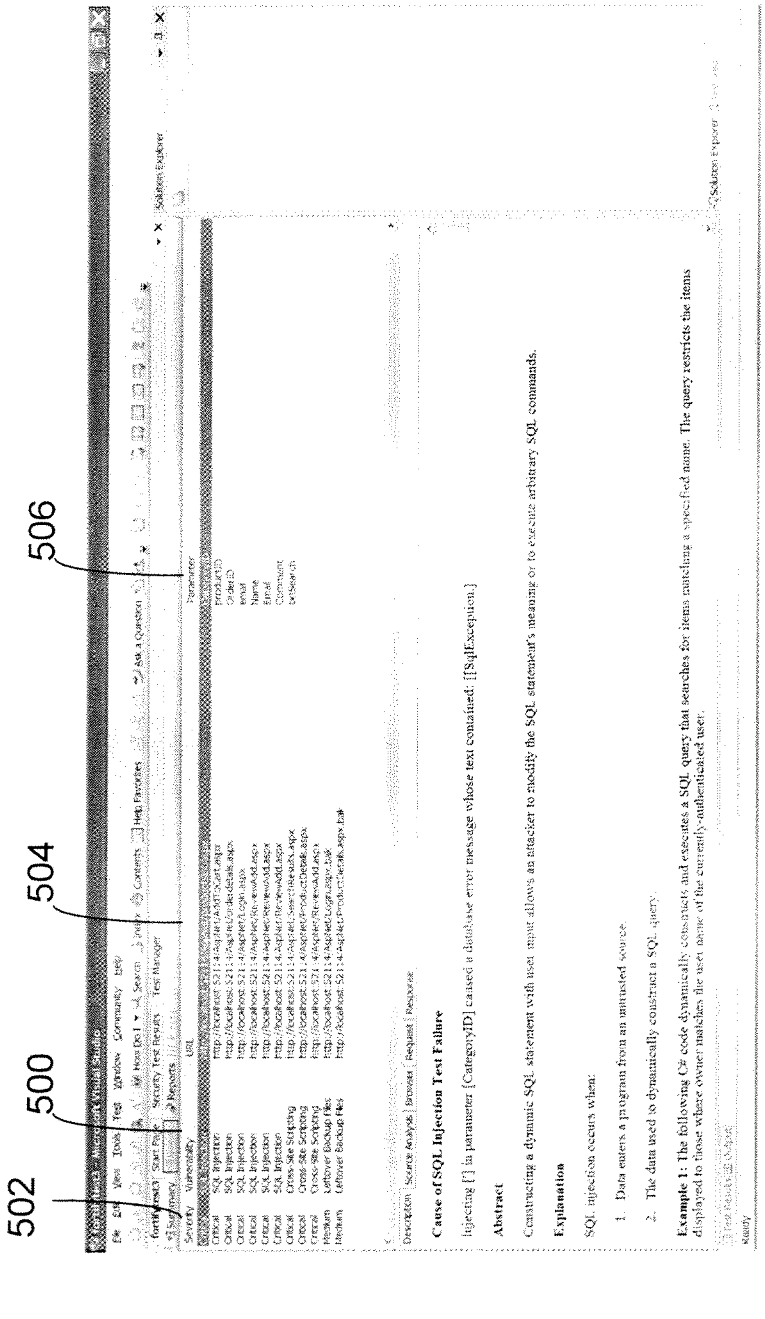
FIG. 5 illustrates another screen shot of security issues reported in accordance with an embodiment of the invention.

FIG. 5 is a screenshot displaying the results of dynamic testing. In this example, the graphical user interface includes a column specifying a vulnerability 500. Another column specifies a severity level 502. The remaining columns specify a URL 504 and an associated parameter 506.

Attention now turns toward various techniques to link information from static and dynamic analyses. In order to make use of a network-based software application, a user must know how to access the application on the network. For example, in order to visit a web site, a user must determine the Uniform Resource Locator (URL) for the web site. Access information can take other forms for other types of applications. In order to access a Web Service, a client needs to understand both where to find the web service and how to create XML messages that the Web Service will understand.

In many cases, the access information for an application can be derived by examining the application's source code and configuration files. A static analysis tool can realize a number of benefits by incorporating this access information into the results it produces. For example, the access information can be used by a security auditor in order to better understand the ramifications of the issues reported by the static analysis tool. For example, the URL may indicate whether a vulnerable web page is accessible only to employees inside a company or accessible to anonymous internet users. The access information can also be used in order to aggregate the static analysis results for reporting purposes. For example, a security assessment may want to compare the number of issues reported for partial URLs beginning with /banking to the number of issues reported for partial URLs beginning with /games. The access information enables a dynamic testing tool to associate a source code analysis result with a dynamic testing result. The access information also enables a dynamic testing tool to use the static analysis output to generate better tests.

Retrieving this "access information" or linkage information can be done in a variety of ways. One way to retrieve access information is by analyzing source code and various configuration files. Often, the configuration tiles are used by web servers to map a specific URL to a specific class. Here is an example of a section in a "web.xml" configuration file for a J2EE application:

```
....
    <servlet>
    <servlet-name>TestServlet</servlet-name>
    <servlet-class>com.fortify.TestServlet</servlet-class>
    <load-on-startup>1</load-on-startup>
</servlet>
    <servlet-mapping>
        <servlet-name>TestServlet</servlet-name>
        <url-pattern>/TestServlet</url-pattern>
</servlet-mapping>
<servlet>
        <servlet-name>action</servlet-name>
        <servlet-class>org.apache.struts.action.ActionServlet</servlet-
        class>
        <init-param>
            <param-name>config</param-name>
            <param-value>/WEB-INF/struts-config.xml</param-value>
        </init-param>
        <init-param>
            <param-name>debug</param-name>
            <param-value>2</param-value>
        </init-param>
        <init-param>
            <param-name>detail</param-name>
            <param-value>2</param-value>
        </init-param>
        <load-on-startup>2</load-on-startup>
</servlet>
    <servlet-mapping>
        <servlet-name>action</servlet-name>
        <url-pattern>*.do</url-pattern>
    </servlet-mapping>
....
```

In this example, there are two mappings shown in bold. The first provides a mapping between a URL that matches the pattern "/TestServlet" to invoke a class file called "com.fortify.TestServlet". The second mapping indicates that any URL that ends in ".do" should invoke the class "org.apache.struts.action.ActionServlet". By analyzing these configuration files, it is possible to gain this access information.

Here is an example of a URL: http://wwvv.somehost.com/TestServlet" and the corresponding source code for com.fortify.TestServlet:

```
package com.fortify;
import java.io.*;
import javax.servlet.*;
import javax.servlet.http.*;
public class TestServlet extends HttpServlet
{
    public void doGet (HttpServletRequest request, HttpServletResponse
    response)
    throws ServletException, IOException
    {
        response.setContentType("text/html");
        ServletOutputStream os = response.getOutputStream( );
        os.println(
            "<html>"
            + "<head><title>Hello World</title></head>"
            + "<body>"
            + "<h1>Hello World</h1>"
            + "</body></html>"
            );
```

-continued

```
    }
    public TestServlet ( ) {
    }
}
```

From the above example, if one knows that there is a security vulnerability in TestServlet, the way to access that vulnerability is through the URL "http://[host]/TestServlet", where [host] is replaced by the IP address or machine name of the web server that is running this application.

Different frameworks use different configuration files to further specify the mapping information. In the above example, there was a mapping that specified any URL that ends in ".do" should invoke the "ActionServlet". The ActionServlet is actually part of another framework that does further mapping in its own configuration files. To gain more specific mapping information, it is required to analyze each of these frameworks and their configuration files. For example, here is an example of a section in the configuration file "struts-config.xml" for a "Struts" framework:

```
. . .
<action-mappings>
    . . .
    <action
    path="/saveItem"
    type-"com.order.splc.AddItemAction"
    name="itemForm"
    scope="request"
    validate="true"
    input="/pages/SaveItem.jsp">
    <forward name="success" path="/listItems.do"/>
    </action>
    . . .
</faction-mappings>
. . .
```

This configuration file indicates that a URL with the pattern "saveItem" is mapped to a JSP page "SaveItem.jsp" and that any action for that URL will invoke the "com.order.splc.AddItemAction" class.

For example, URL "http://[host]/saveItem.do" (where [host] is replaced by the IP address or machine name of the web server that is running this application) will access the source code for "com.order.splc.AddItemAction", example shown below:

```
package com.order.splc;
import javax.servlet.http.HttpServletRequest;
import javax.servlet.http.HttpServletResponse;
import org.apache.struts.action.Action;
import org.apache.struts.action.ActionForm;
import org.apache.struts.action.ActionForward;
import org.apache.struts.action.ActionMapping;
import java.util.logging.Logger;
public class AddItemAction extends Action
{
    private static Logger log =
    Logger.getLogger(AddItemAction.class.getName( ));
    public ActionForward execute(ActionMapping mapping,
ActionForm form, HttpServletRequest request, HttpServletResponse
response)
        throws java.sql.SQLException
    {
        log.info("AddItemAction execute");
        /*
         * Cast generic form to the AddItemForm.
         */
        AddItemForm addItemForm = (AddItemForm) form;
```

-continued

```
        if (addItemForm.getBean( ).getAccount( ) != null)
        {
            ItemService.getInstance( ).addItem(addItemForm.getBean( ));
            addItemForm.reset(mapping, request);
        }
        return mapping.findForward("home");
    }
}
```

The information needed to understand which configuration files to analyze, as well as how to interpret those configuration files, are described in various different specifications. One such example is the Java Servlet Specification. It is possible to take the information in each of these specifications and put it into a program that can automate the finding of the mappings between source code and URL (and other forms of access point specification).

Another way to accumulate access information is to simply ask people who are familiar with the application, such as the developer who actually wrote the application. Such an individual can provide the mapping/linkage information between the URL and the class files. For example, one can ask the person to prepare a list, such as shown in Table 1.

TABLE I

| Source Code | URL |
|---|---|
| TestServletjava | http://somesite.com/TestServlet |
| . . . | . . . |

Another way to accumulate access information is to embed monitors inside an application. The monitors then generate runtime information when the application is executed. The runtime information includes an accessed URL and corresponding set of code (e.g., a corresponding class). In other words, when the application is accessed, the monitors inside the application report what URLs accessed which parts of the compiled application code, thus providing the mapping access information between CIRLs and class files.

The following is an example of the monitor code to retrieve URI, and the class information:

```
import java.sql.*;
import java.lang.*;
import java.io.*;
import org.aspectj.lang.*;
aspect SQLMonitor{
pointcut sqlExec(String sql):
    call(ResultSet Statement.execute uery(String))
    && args(sql);
    before(String sql): sqlExec(sql) {
    report(sql, thisJoinPoint);
    }
    void report(String sql, JoinPoint thisJoinPoint){
    System.out.println("Source code being access is this:"+
        thisJoinPoint.getSourceLocation( ).getFileName( );
    System.out.println("Signature & Source Line being access
        is as follows:"+thisJoinPoint.getSignature( )+" "+this-
        JoinPoint.getSourceLocation( ) getLine( );
    System.out.println("URL accessing this code is as follows:
        "+URLUtility.getURL( ));
    }
}
```

Figure 6:
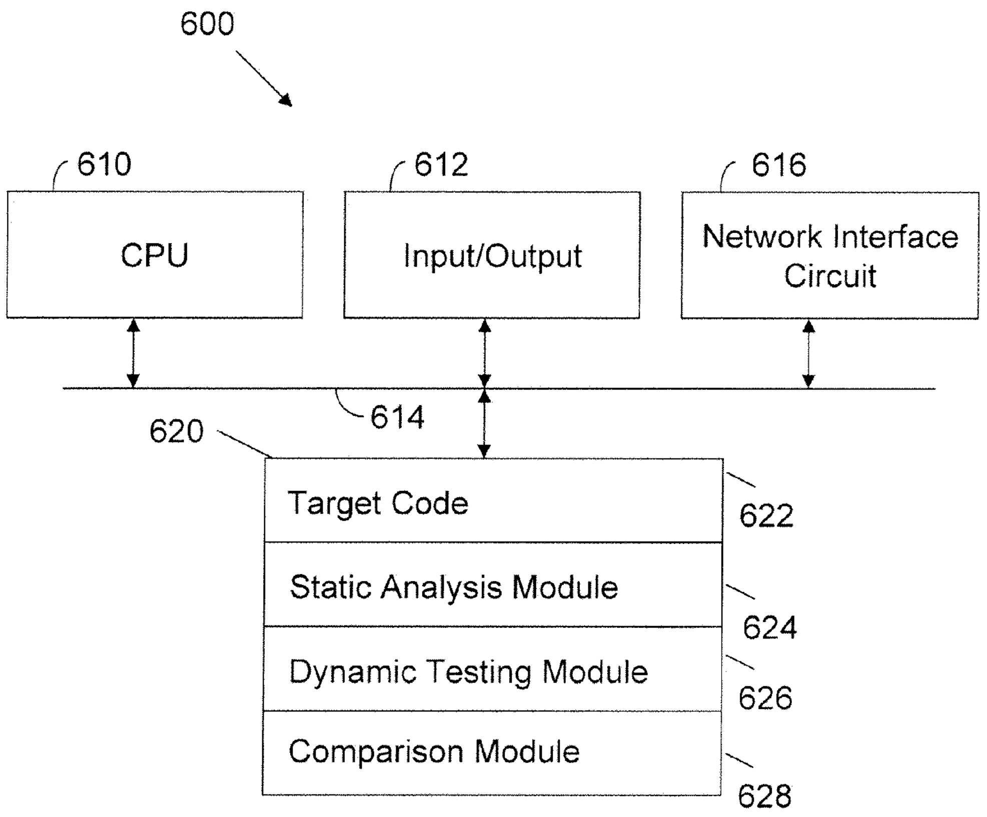
FIG. 6 illustrates a computer configured in accordance with an embodiment of the invention.

FIG. 6 illustrates a computer 600 configured in accordance with an embodiment of the invention. The computer 600 includes standard components, such as a central processing unit 610 connected to a set of input/output devices 612 via a bus 614. The input/output devices 612 may include a keyboard, mouse, display, printer and the like. A network interface circuit 616 is also connected to the bus 614 to provide connectivity to a network (not shown). Thus, the computer 600 may operate in a client/server environment.

A memory 620 is also connected to the bus 614. The memory 620 stores executable instructions to implement operations of the invention. For example, the memory 620 stores target code 622, which is the code that is subject to static and dynamic testing. The memory 620 also stores a static analysis module 624 to implement a static analysis of the target code 622. A dynamic testing module 626 performs dynamic testing against the target code 622. The dynamic testing module 626 may be configured to tailor its dynamic testing based upon the results of the static analysis. A comparison module 628 includes executable instructions to process the results of the static analysis module 624 and the dynamic testing module 626, for example by comparing a first set of security issues identified by the static analysis module 624 and a second set of security issues identified by the dynamic testing module 626 to report common security issues. The executable modules of FIG. 6 are exemplary. The functions of the modules may be combined. Similarly, the functions of the modules may be distributed across a network. It is the operations of the invention that are significant, not where or how they are implemented.

Those skilled in the art will appreciate that there are any number of alternate ways to utilize the techniques of the invention. For example, the dynamic testing module 626 may be initially executed against the target code 622. The security issues identified during dynamic analysis may then be used to inform the static analysis. That is, the static analysis module 624 may be configured to accept input from a dynamic analysis and tailor its static analysis accordingly.

The static analysis module 624 may be combined with the comparison module 628. In this case, the static analysis module 624 generates a first set of security issues (e.g., static security issues), while the comparison module receives a second set of security issues (e.g., dynamic testing security issues) and reports common security issues. Similarly, the dynamic testing module 624 may be combined with the comparison module 628. In this configuration, the dynamic testing module 624 generates a first set of security issues (e.g. dynamic testing security issues), while the comparison module receives a second set of security issues (e.g., static security issues) and reports common security issues.

The static analysis module 624 may also be configured to generate a set of security issues and mapping information associated with the security issues. For example, the mapping information may specify code segments with security issues and corresponding UREs.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs. DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:

execute a dynamic analysis of target code to identify a first set of identified security issues, wherein each security issue in the first set of identified security issues includes a first security category, a complete Uniform Resource Locator (URL), and a first common parameter name;

perform a static analysis of the target code to identify a second set of identified security issues wherein the first set of identified security issues are used to tailor the static analysis and wherein each security issue in the second set of identified security issues includes a second security category, a partial URL, and a second common parameter name; and compare the first set of identified security issues and the second set of identified security issues to report common identified security issues wherein common identified security issues include the first security category that matches the second category, the complete URL that matches the partial URL, and the first common parameter name that matches the second common parameter name.

2. The non-transitory computer readable storage medium of claim 1 wherein the executable instructions to perform a static analysis include executable instructions to analyze configuration files to map a URL to a subset of code and thereby provide access information for a dynamic analysis.

3. The non-transitory computer readable storage medium of claim 2 further comprising executable instructions to analyze configuration files to map the URL to a class.

4. The non-transitory computer readable storage medium of claim 1 wherein the executable instructions to perform a static analysis include executable instructions to access a list equating and subsets of code to provide access information for a dynamic analysis.

5. The non-transitory computer readable storage medium of claim 4 further comprising equating URLs with classes.

6. The non-transitory computer readable storage medium of claim 1 further comprising executable instructions to embed monitors in the set of target code.

7. The non-transitory computer readable storage medium of claim 6 further comprising executable instructions to receive runtime information from the monitors during dynamic analysis.

8. The non-transitory computer readable storage medium of claim 7 wherein the runtime information includes an accessed and corresponding subset of the set target code.

9. The non-transitory computer readable storage medium of claim 8 further comprising executable instructions to associate the URL with a class.

10. The non-transitory computer readable storage medium of claim 1 further comprising monitors in the target code to generate runtime information when the target code is executed.

11. The non-transitory computer readable storage medium of claim 10 wherein the runtime information includes a URL and a corresponding class file.

12. A non-transitory computer readable storage medium, comprising executable instructions to:

execute a dynamic analysis of target code to identify a first set of identified security issues, wherein the dynamic analysis includes retrieving Uniform Resource Locators (URLs) and corresponding class files from monitors in the target code and wherein each security issue in the first set of identified security issues includes a first security category, a complete URL, and a first common parameter name;

perform a static analysis of the target code to identify a second set of identified security issues, wherein the first set of identified security issues are used to tailor the static analysis and wherein each security issue in the second set of identified security issues includes a second security category, a partial URL, and a second common parameter name; and compare the first set of identified security issues and the second set of identified security issues to report common security issues wherein common identified security issues include the first security category that matches the second category, the complete URL that matches the partial URL, and the first common parameter name that matches the second common parameter name.

* * * * *

UNITED STATES PATENT AND TRADEMARK OFFICE

CERTIFICATE OF CORRECTION

PATENT NO. : 8,528,093 B1
APPLICATION NO. : 11/734114
DATED : September 3, 2013
INVENTOR(S) : Toshinari Kureha et al.

It is certified that error appears in the above-identified patent and that said Letters Patent is hereby corrected as shown below:

In the Claims

In column 14, line 7, in Claim 4, delete “and” and insert -- URLs and --, therefor.

Signed and Sealed this
Twenty-fifth Day of March, 2014

Michelle K. Lee
*Deputy Director of the United States Patent and Trademark Office*